Figure 1:
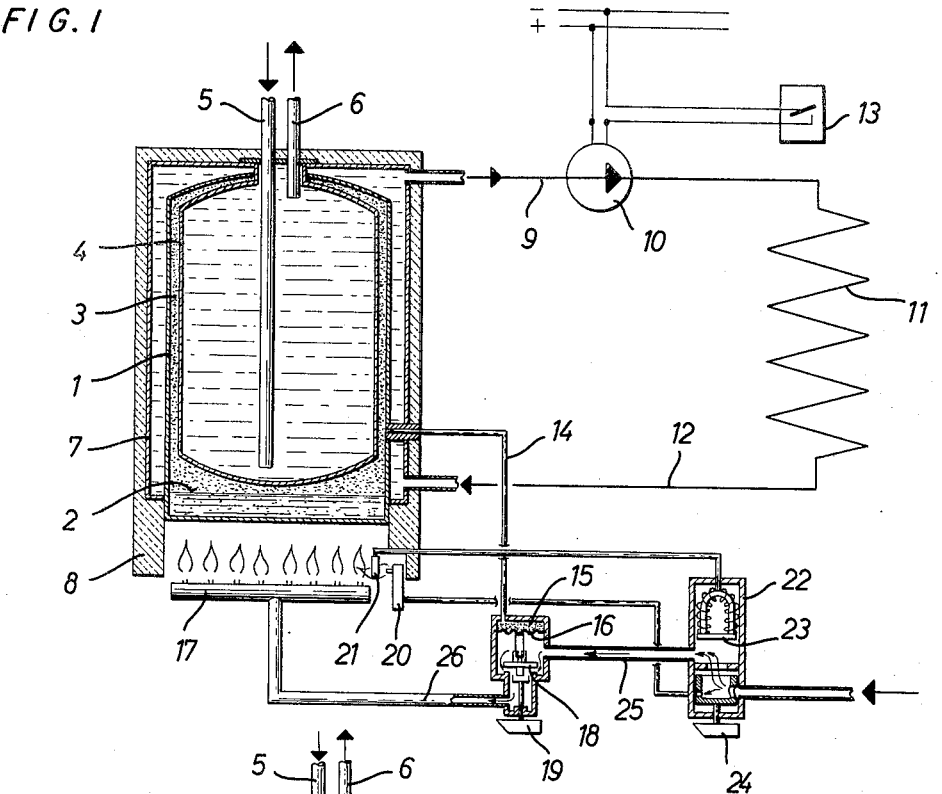

March 1, 1966

W. BRANDL 3,237,608

APPARATUS FOR HEATING AT LEAST TWO
VESSELS BY A SINGLE SOURCE OF HEAT

Filed Oct. 25, 1963

2 Sheets-Sheet 1

INVENTOR
Willi Brandl
By Dicke & Craig
ATTORNEYS

INVENTOR
Willi Brandl
By Dicke & Craig
ATTORNEYS

United States Patent Office 3,237,608
Patented Mar. 1, 1966

3,237,608
APPARATUS FOR HEATING AT LEAST TWO VESSELS BY A SINGLE SOURCE OF HEAT
Willi Brandl, Schurbungert 12, Zurich, Switzerland
Filed Oct. 25, 1963, Ser. No. 319,062
Claims priority, application Germany, Oct. 31, 1962,
B 69,419
5 Claims. (Cl. 122—33)

The present invention relates to an apparatus for heating at least two vessels, preferably for producing hot water for consumption and for room-heating purposes, respectively, by means of a single heating source, such as an electric heater or a gas or oil burner.

In a prior apparatus of this type, two vessels which are spaced from each other are heated simultaneously and directly by the same heating source. One of these vessels holds water for consumption, while the other forms, for example, a boiler of a hot-water room heating system. This apparatus may be heated either by coal, coke, or by a gas or oil burner. The heat thus produced acts upon both vessels. If a solid fuel is used, the fire must be kept going continuously and the heat produced by such a fuel must be regulated by varying the air supply to the combustion chamber. If these two vessels are heated by a gas or oil burner, one of them is associated with a thermostat, whereby the burner is switched off as soon as the temperature in this vessel reaches a certain value which is adjustable on the thermostat. If the temperature in this vessel decreases due, for example, to the withdrawal of a part of its contents, the burner is again switched on when the temperature has dropped to a certain value, and both vessels are then heated again until the temperature set on the thermostat is reached, whereupon the burner, controlled by the thermostat, is again switched off.

If this apparatus is heated by a gas or oil burner, one of the vessels is overheated when the other vessel has given off heat and when the thermostat of the latter therefore again switches on the burner even though no heat has been withdrawn from the first vessel. If this is avoided by providing a separate thermostat for each vessel, the result occurs that that thermostat of the vessel which is heated to a selected temperature and has not given up any heat will switch off the burner even though the other vessel requires further heat. Therefore, as long as no heat is required of one system, the other system remains inoperative. Although certain compromises may be made to alleviate this interdependence, such compromises lead, in turn, to other disadvantages. This apparatus also requires the vessels to have certain sizes, shapes or surfaces.

In another prior apparatus for heating two vessels, the single heating source heats up only one vessel which may be, for example, the boiler of a hot-water room heating system. The heated water then gives up its heat by means of radiators to the air surrounding the latter, while the cooled water is returned to the boiler. A part of this water circulation system is then employed for heating a second vessel or boiler containing water for consumption. The heat of the room heating system is therefore also used for heating the water for consumption. If there is any water withdrawn from the hot-water taps, the water contained in the heating circuit of the room heating system is also colled off since the amount of hot water which is withdrawn from the taps of the other system is replaced in the boiler of this system by cold water. In this case, the vessel which is heated directly by the heating source is provided with a thermostat so as to prevent it from being overheated. The temperature of the water contained in the second vessel or boiler and the temperature of the water which is circulated through the radiators of the room heating system are controlled by mixing devices, control valves, or the like. This construction has the disadvantage that the indirectly heated system must follow the changes in temperature of the directly heated system and can never be hotter than the latter which is heated directly or by heating gases. The extent of the heat transmission from one system to the other depends upon the surface contact between the two systems.

Since in the systems of both types as described above the heating gases engage directly with at least one vessel or heating system and have to heat up its entire contents, a considerable amount of condensed water is formed, especially when the heating is started or when the vessels or systems are suddenly cooled. This condensation in coaction with the chemicals of the flue gases may lead to considerable corrosion of the directly heated vessel.

It is an object of the present invention to improve the apparatus of the mentioned types in a manner so as to avoid the undesirable interdependence of the vessels or systems which are heated by a common heating source and to provide a temperature control which does not impair either of the two systems, even though only one control unit is employed. It is a further object of the invention to prevent the heating gases from cooling off on the walls of the vessels or systems to be heated so far that condensation occurs thereon either when the apparatus is heated up or when a considerable amount of heat is suddenly withdrawn from one of the vessels or systems.

This object is attained according to the invention by providing at least the two vessels containing the water or other liquid to be heated in a position separately from each other in or adjacent to a closed container which contains a fluid medium which may be heated directly by the heating source and communicates with a control unit which is responsive to the pressure or the temperature existing in this chamber. Consequently, the two systems are no longer heated directly and one of these systems is no longer used for heating indirectly one or more other systems. It is advisable to mount at least one of the vessels of the two systems at the inside of the container which is heated directly by the heating source. However, it is also possible to design the apparatus so that at least one of the vessels forms the outer jacket of the container which is heated directly by the heating source. It is particularly of advantage to evacuate the directly heated container and to fill it only partly with a liquid such as water, and to separate the vessels containing the water or other liquids to be heated by the steam space of the mentioned container.

The control unit which is associated with the container which is heated directly by the single heating source should be provided with a resilient element such as a diaphragm which may be acted upon by the pressure contained in the mentioned container and is operatively connected to a valve which is interposed in the fuel supply line leading to the burner. This valve should be adjustable by a handle or the like so as to permit the valve to be set so as to close the fuel supply line leading to the burner automatically when a certain selected pressure is reached in the container. If the control is to be carried out in response to the temperature prevailing in the directly heated container, the control means should be designed accordingly, for example, in the form of a thermostat-controlled valve.

If the mentioned container is to be heated directly by an oil or gas burner, the waste or fuel gases before escaping should preferably be passed through pipes leading through the part of the container which is filled with water or other liquid.

The directly heated container transmits its heat to the vessels or systems which are installed in, around or adjacent to the same. The fluid medium filling out this container should therefore have a heating effect and also an insulating effect. The pressure or temperature control as provided according to the invention has the effect that the fluid medium in the container which is heated directly by the heating source not only transmits the maximum temperature which is required by one or the other system, but also prevents this temperature from being exceeded. Since the heating gases of the heating source do not act upon or influence the vessels or systems directly, and since these vessels or systems are separated from each other, they are also insulated from each other. If, as the invention provides, the directly heated container is evacuated and filled only partly with liquid, preferably water, the heating of this liquid results in steam which has a good heat-transmitting effect and also a good insulating effect. Since there is no air in this container, there is also no possibility of any corrosion occurring therein. Since the heating medium when being heated up reaches very quickly a temperature above the condensation limit, the formation of condensed water on the outer wall of the container is avoided at that time and also when the systems are cooled off rapidly. Of course, in place of water or steam it is also possible to use any other heating medium which has approximately the same effect, namely, to transmit heat and to insulate the individual vessels or systems from each other.

The heating of the vessels by this container occurs extremely quickly by condensation of the steam on cooler surface portions of these vessels. It is advisable to prevent the condensation of steam of a certain temperature on surfaces of these vessels of an equal or higher temperature so that these surfaces will not be further heated. The heat transmission is therefore concentrated automatically and intensively upon those points of the vessels where cooling has occurred or where heat is required. There is a temperature gradient between the steam and the vessels to be heated. Thus, for example, the gradient between the steam and the vessels to be heated which have cooled off by the withdrawal of heat is steeper than the gradient between the steam and the system or systems which have already been heated up. There is also no possibility of any overheating of one or more systems since the temperature of the heating medium cannot exceed the preset value.

When heating without any withdrawal of heat from either system, the temperature of the vessels will remain slightly lower than that of the heating medium such as steam. This difference depends upon the surface area of the vessels or systems and of the diaphragm of the control unit and the difference in time between the opening and closing movements of the control valve. If the size of the surfaces is calculated so that a temperature gradient of, for example, 15° C. is required to take up the output of the heating source, the final temperature of the heating medium when the control unit shuts off the fuel supply will be 15° C. higher than that of the vessels or systems to be heated. The control unit is then adjusted so as to operate when the difference in temperature amounts to 15° C. This generation of steam in the evacuated container has the result that, when the vessels or systems are being heated, there will not be any slow rise in temperature and it will be possible, even though the surface area of the vessels is relatively small, to transmit the output of heat without requiring any interruption of the heating by increasing the temperature gradient.

If, for example, a boiler of a room heating system and that of a hot-water system are supplied with heat by the container which may be heated directly by the heating source and if heat is withdrawn, for example, from the room heating system, the heating source is switched on and only that vessel is heated which supplies the room heating system with hot water inasmuch as the water in the hot-water system remained and continues to remain at the preset temperature since both systems are independent of each other even though they are heated by a single heating source. If at the same time water is drawn off the hot-water system, a part of the heat output is also given up to the boiler of this system. If all radiators of the room-heating system are shut off before the boiler of the hot-water system has reached the preset temperature, the heating source remains switched on until the heating medium in the container which is heated directly by this source has again heated this boiler to the preset temperature. If therefore hot water is withdrawn only from the hot-water system, only the boiler of this system is heated up.

The features and advantages of the present invention will become more clearly apparent from the following detailed description thereof, which is to be read with reference to the accompanying diagrammatic drawings. Since it is of particular advantage to separate the vessels to be heated by a steam chamber, it is assumed in these drawings and their description that these vessels are separated by the steam space of the container which is heated directly by the single heating source. It is, however, also possible—although with the result of a lower efficiency of the apparatus—to separate the vessels by another heating medium, for example, water.

Figure 2:
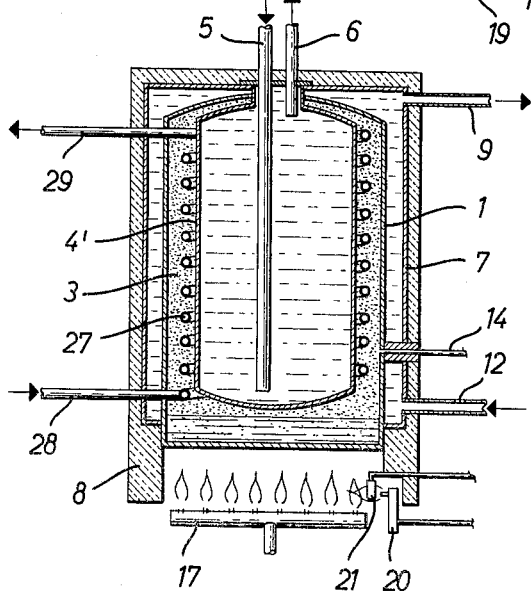
Figure 3:
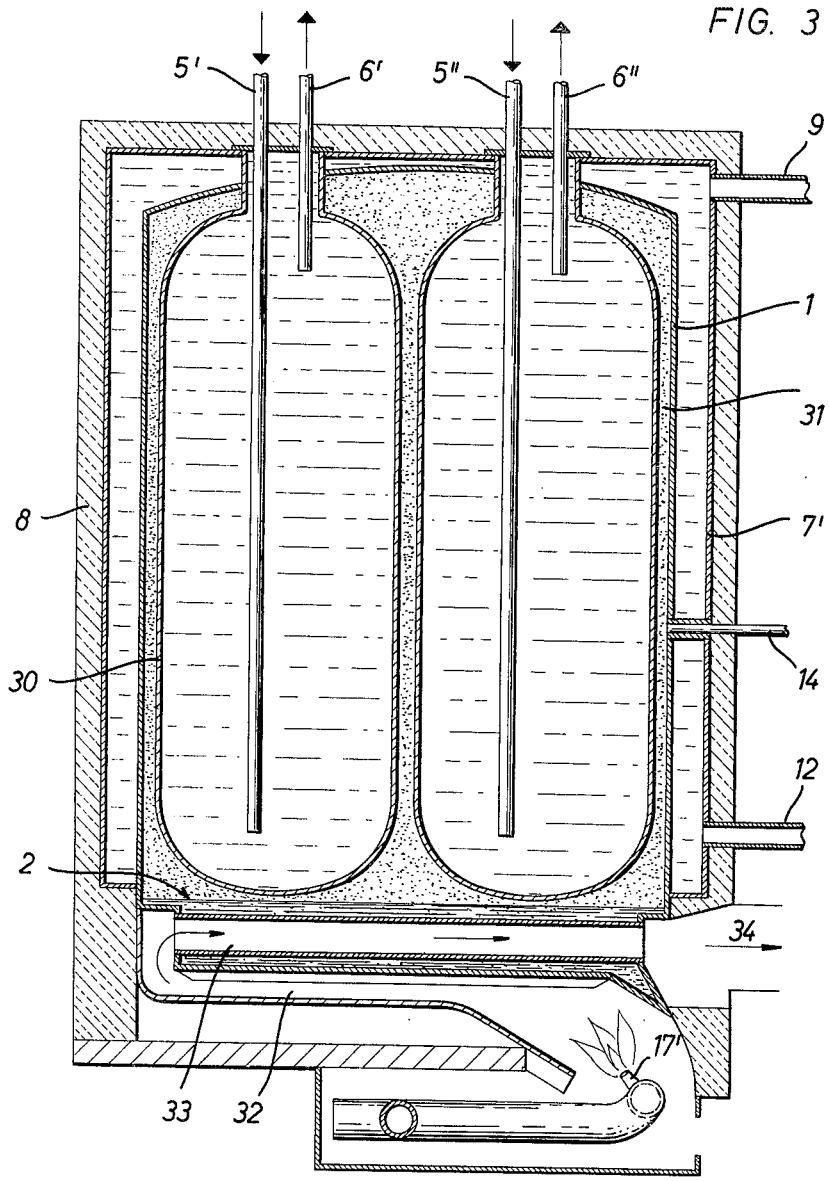

In the drawings:

FIGURE 1 shows the general assembly of an apparatus and the associated control means according to the invention comprising two vessels which contain liquids such as water and are associated with an evacuated container which is partly filled with water, and in which one of these two vessels is mounted at the inside of the steam space of the evacuated container, while the other vessel surrounds the walls of the evacuated container;

FIGURE 2 shows the assembly of a modification of the apparatus according to the invention, in which two systems are mounted in the steam space of the evacuated container, while a third system encloses the outer walls of this container; while FIGURE 3 shows the assembly of a modification of the apparatus according to FIGURE 2 which differs therefrom only by the fact that the steam space of the evacuated container contains two equal vessels and that the waste or flue gases from a gas or oil burner pass through the water compartment of the evacuated container.

As illustrated in FIGURE 1 of the drawings, the apparatus according to the invention consists essentially of a closed container 1 which is heated directly by a heating source and is partly filled with a vaporizable liquid 2, preferably water, and is otherwise evacuated. The evacuated part 3 of this container 1 contains a vessel 4 serving as a boiler which is supplied with fresh water through a pipe 5, while the heated water is withdrawn therefrom through a pipe 6. The container 1 is mounted within another vessel or boiler 7 which is enclosed by an insulation 8. The boiler water contained in vessel 7 passes through a feed line 9 and a pump 10 to the radiators 11 and then through the return line 12 back to vessel 7. It is immaterial whether the feed line 9 is connected to the upper or lower part of vessel 7. It is, however, advisable to connect the feed line as well as the return line tangentially to the vessel 7 so that the boiler water in vessel 7 will circulate around the entire surface of the container.

The operation of the pump 10 is controlled by a room thermostat 13. This means that, when the temperature in the room in which the thermostat is located reaches the value as set thereon, pump 10 is switched off and stopped, and that the pump is switched on when the room temperature drops below the preset value. Of course, it is also possible to switch the pump on and off by any other control means or the pump may be allowed to run continuously if the heating is controlled by a thermostat.

The evacuated part 3 of container 1 is connected by a pipe line 14 with a chamber 15 of a control unit which is limited at one side by a diaphragm 16. This diaphragm controls an element which, in turn, controls the heat supply to the container 1. Since in the particular embodiment of the invention as shown in the drawings, it is assumed that the container 1 is heated by means of a gas burner 17, this element consists of a control valve for regulating the supply of gas to the gas burner 17. This control valve comprises a valve member 18 which is connected to and moved by the diaphragm 16. The distance between diaphragm 16 and valve member 18 may be adjusted by means of a handle 19 so as to permit the valve member 18 to be set so as to shut off the supply of fuel when the steam pressure in vessel 1 reaches a certain value. Gas burner 17 is associated with a pilot burner 20, flame of which acts upon a thermocouple element 21 the thermocurrent of which passes to a solenoid valve 22 which maintains a gas shutoff valve 23 in the open position as long as the pilot flame keeps burning. Valve 23 may be operated manually by a handle 24.

If the apparatus according to the invention is to be put into operation with the diaphragm valve 18 being set to a maximum steam pressure, handle 24 is depressed so that the shutoff valve 23 is opened. The gas emerging from the pilot burner is then ignited, whereupon handle 24 is actuated so as to supply gas through lines 25 and 26 to the gas burner 17. During this period, the thermocouple 21 is heated so that the shutoff valve 23 will be held in the position as indicated in FIGURE 1. The burner 17 then heats the water contained in container 1, whereby steam is produced in the evacuated space 3 of this container. The heat of this steam is transmitted through the wall of vessel 4 to the water therein and through the outer wall of container 1 to the boiler water in vessel 7. Thus, the contents of both vessels 4 and 7 are heated. When the steam reaches a temperature corresponding to the steam pressure as preset by valve member 18, the latter shuts off the gas supply to the gas burner 17. The pilot flame, however, continues to burn.

If water is withdrawn, for example, from vessel 4 through the line 6 and replaced by fresh cold water, the temperature of the steam in the evacuated space 3 drops and, due to its condensation on the wall of vessel 4, the steam pressure drops likewise. Valve member 18 is thereby lifted automatically off its seat so that gas is supplied through the pipe lines 25 and 26 to the gas burner 17. The same procedure occurs if heat is withdrawn from the boiler water in vessel 7. Since the vacuum or steam space 3 of container 1 acts as an insulation between the two vessels 4 and 7, only the water in that vessel is reheated from which heat has been withdrawn.

FIGURE 2 shows a modification of the apparatus according to FIGURE 1, but in principle corresponds to the latter. In this case, the container 1 contains two systems with liquids such as water to be heated therein, that is, a vessel 4' and a heating coil 27 surrounding the same. The liquid to be heated in the heating coil 27 is supplied by a line 28 and withdrawn by a line 29.

The further modification of the apparatus as illustrated in FIGURE 3 also corresponds in principle to the apparatus according to FIGURE 1 and differs therefrom only by the fact that the evacuated container 1 contains two vessels 30 and 31 of the same size and shape. The liquid to be heated is supplied to these vessels through lines 5' and 5" and is discharged therefrom through the lines 6' and 6". Similarly as in the apparatus according to FIGURES 1 and 2, the container 1 is also in this case surrounded by a vessel 7' which, in turn, is enclosed by an insulation 8. The burned gases from a burner 17' are passed through a channel 32 and then through pipes 33 which extend through the water compartment of container 1 before they are discharged from the apparatus in the direction of the arrow 34.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A heating apparatus comprising at least two vessels spaced from each other and each adapted to contain a liquid to be heated, a closed container adjacent to said vessels and containing a medium to be heated to form a vapor for indirectly heating said vessels, at least one of said vessels being disposed within said container, said vessels being separated from each other by the vapor space in said container, heating means adjacent part of the area of said container for directly heating the medium in said container, and adjustable control means connected to said container and responsive to the conditions prevailing at any time in said container to control said heating means.

2. A heating apparatus as defined in claim 1, in which said container is partially evacuated.

3. A heating apparatus as defined in claim 1, in which at least one of said vessels surrounds said container, except for the area being directly heated by said heating means, and in which at least one of said vessels is enclosed within said vapor space.

4. A heating apparatus as defined in claim 3, in which one vessel is enclosed within said vapor space.

5. A heating apparatus as defined in claim 3, in which two vessels are enclosed within said vapor space.

References Cited by the Examiner

UNITED STATES PATENTS

| | | | |
|---|---|---|---|
| 1,663,562 | 3/1928 | Parkinson | 122—32 X |
| 1,779,538 | 10/1930 | Grady | 165—140 |
| 1,840,588 | 1/1932 | Knox | 122—32 |
| 1,908,041 | 5/1933 | Miller | 122—32 X |
| 2,055,949 | 9/1936 | Sharp | 122—33 |
| 2,291,872 | 8/1942 | Brantly | 122—448 |

EDWARD J. MICHAEL, *Primary Examiner.*